(12) United States Patent
Morishita

(10) Patent No.: US 8,300,977 B2
(45) Date of Patent: Oct. 30, 2012

(54) IMAGING DEVICE AND IMAGE PROCESSING PROGRAM FOR ESTIMATING FIXED PATTERN NOISE FROM PARTIAL NOISE OUTPUT OF AVAILABLE PIXEL AREA

(75) Inventor: Akihiko Morishita, Hiratsuka (JP)

(73) Assignee: Nikon Corporation, Tokyo (JP)

( * ) Notice: Subject to any disclaimer, the term of this patent is extended or adjusted under 35 U.S.C. 154(b) by 362 days.

(21) Appl. No.: 11/248,240

(22) Filed: Oct. 13, 2005

(65) Prior Publication Data

US 2006/0098888 A1    May 11, 2006

(30) Foreign Application Priority Data

Oct. 22, 2004    (JP) .................. 2004-308621

(51) Int. Cl.
*G06K 9/40*    (2006.01)
*H04N 9/64*    (2006.01)
*H04N 5/202*    (2006.01)
*H04N 1/40*    (2006.01)
*G03F 3/08*    (2006.01)

(52) U.S. Cl. ........ 382/275; 382/167; 348/241; 348/533; 348/606; 348/701; 348/908; 358/1.9; 358/447; 358/461; 358/463; 358/518

(58) Field of Classification Search .................. 382/275, 382/167; 348/241–251, 533, 606–624, 701, 348/908; 358/1.9–3.31, 447, 461, 463, 518–523; 702/192
See application file for complete search history.

(56) References Cited

U.S. PATENT DOCUMENTS

| | | | |
|---|---|---|---|
| 6,914,627 B1 * | 7/2005 | Dong | 348/248 |
| 7,151,564 B2 | 12/2006 | Kubo | |
| 7,196,725 B1 | 3/2007 | Saigusa et al. | |
| 7,317,481 B2 | 1/2008 | Harada et al. | |
| 7,570,287 B2 * | 8/2009 | Tsuruoka | 348/241 |
| 2003/0122939 A1 * | 7/2003 | Bell et al. | 348/229.1 |
| 2003/0179302 A1 * | 9/2003 | Harada et al. | 348/231.6 |
| 2007/0052813 A1 * | 3/2007 | Neter | 348/222.1 |
| 2008/0074514 A1 * | 3/2008 | Harada et al. | 348/243 |

FOREIGN PATENT DOCUMENTS

| | | |
|---|---|---|
| JP | 06-054262 A | 2/1994 |
| JP | A-06-189200 | 7/1994 |
| JP | A-07-015632 | 1/1995 |
| JP | 10-313428 A | 11/1998 |
| JP | 2003-219180 A | 7/2003 |
| JP | 2004-015712 A | 1/2004 |
| JP | 2004-193729 A | 7/2004 |
| JP | 2004-208240 A | 7/2004 |

OTHER PUBLICATIONS

Japanese Office Action from Japanese Patent Application No. 2004-308621 and English-language translation dated Feb. 9, 2010.

* cited by examiner

*Primary Examiner* — Randolph I Chu
(74) *Attorney, Agent, or Firm* — Oliff & Berridge, PLC

(57) ABSTRACT

An imaging device of the present invention includes an image capturing unit, a noise obtaining unit, a fixed noise calculating unit, and a noise eliminating unit. The image capturing unit generates image data by photoelectrically converting, pixel by pixel, a subject image formed on an available pixel area of a light-receiving surface. The noise obtaining unit reads a noise output from a partial area of the available pixel area. The fixed noise calculating unit calculates an estimation of fixed pattern noise of the available pixel area based on the noise output read from the partial area. The noise eliminating unit subtracts the fixed pattern noise from the image data.

5 Claims, 9 Drawing Sheets

*FIG. 4*
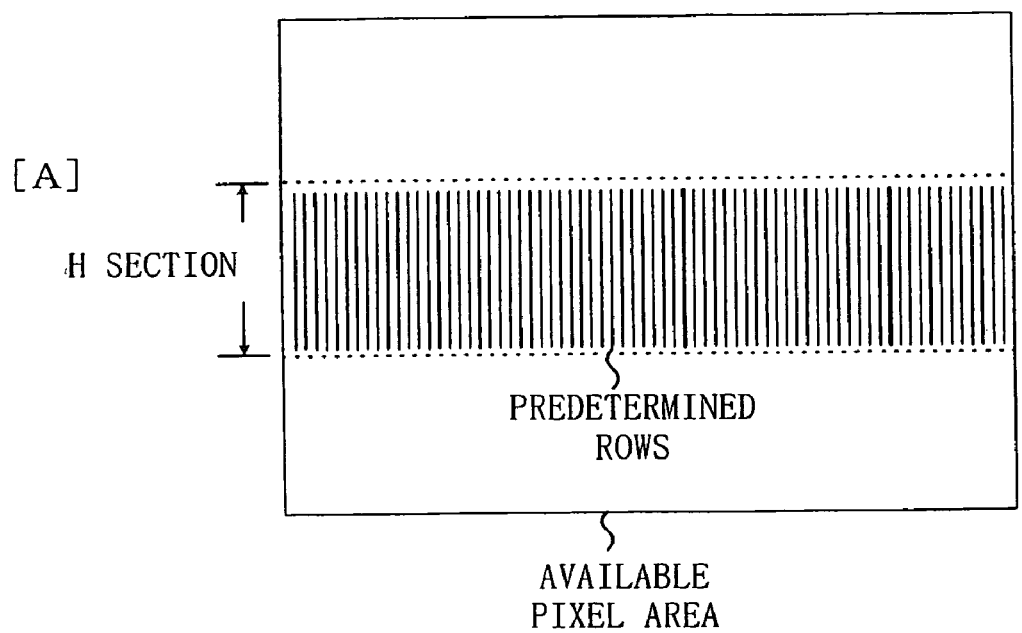
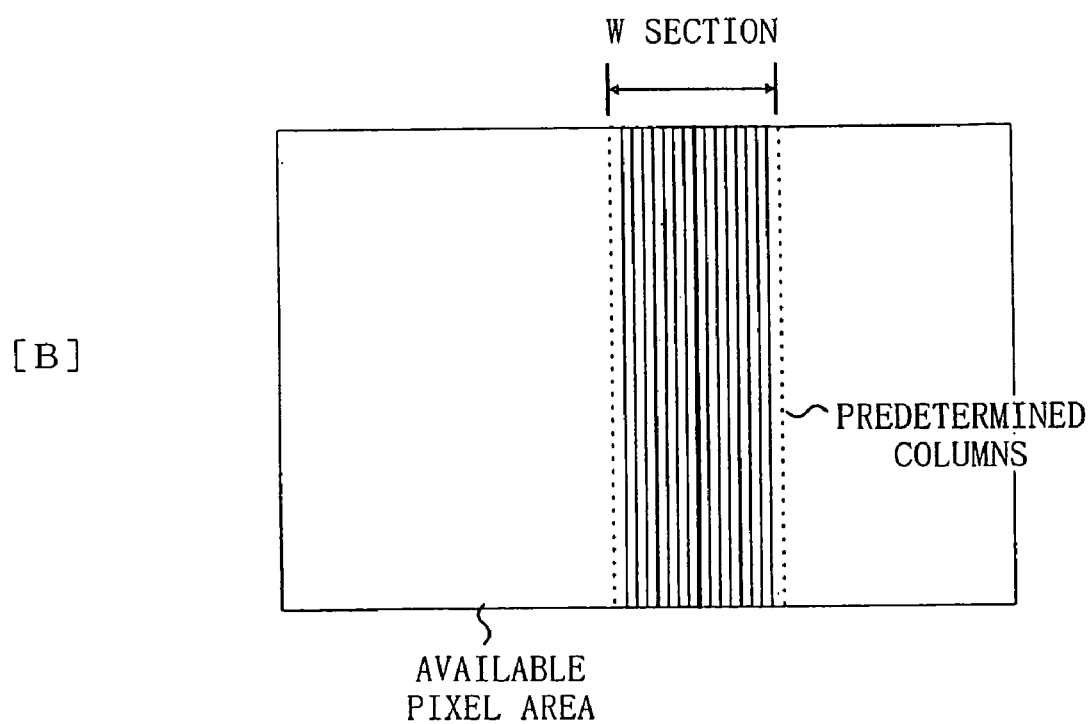

FIG. 5
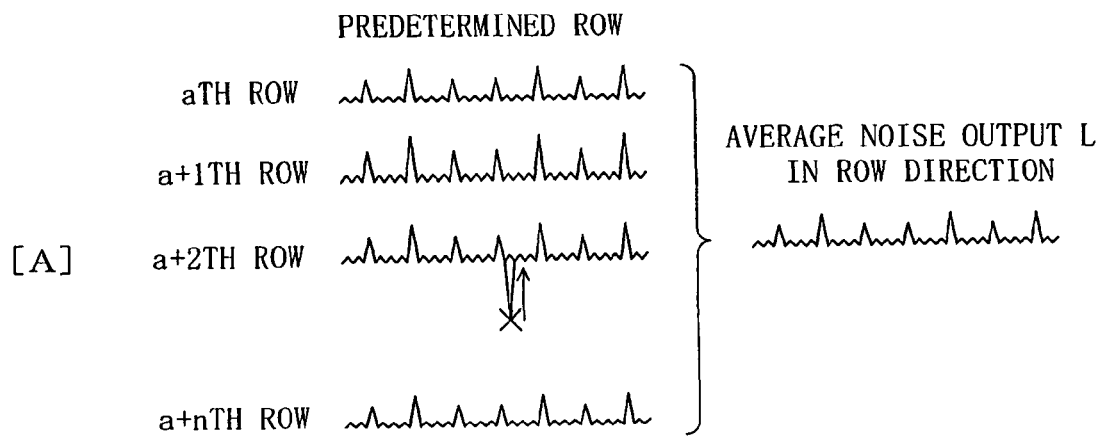
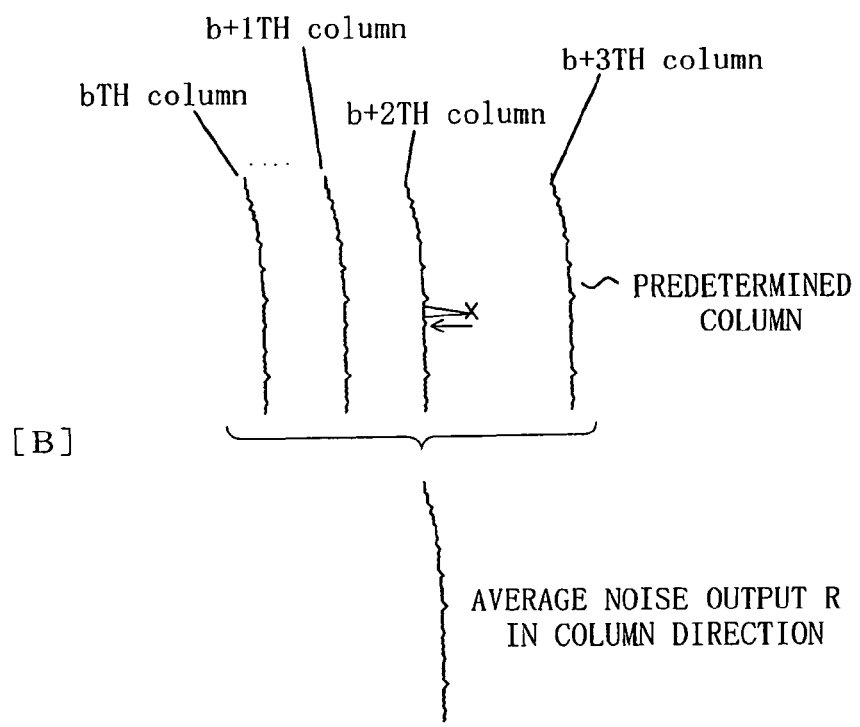

FIG. 8
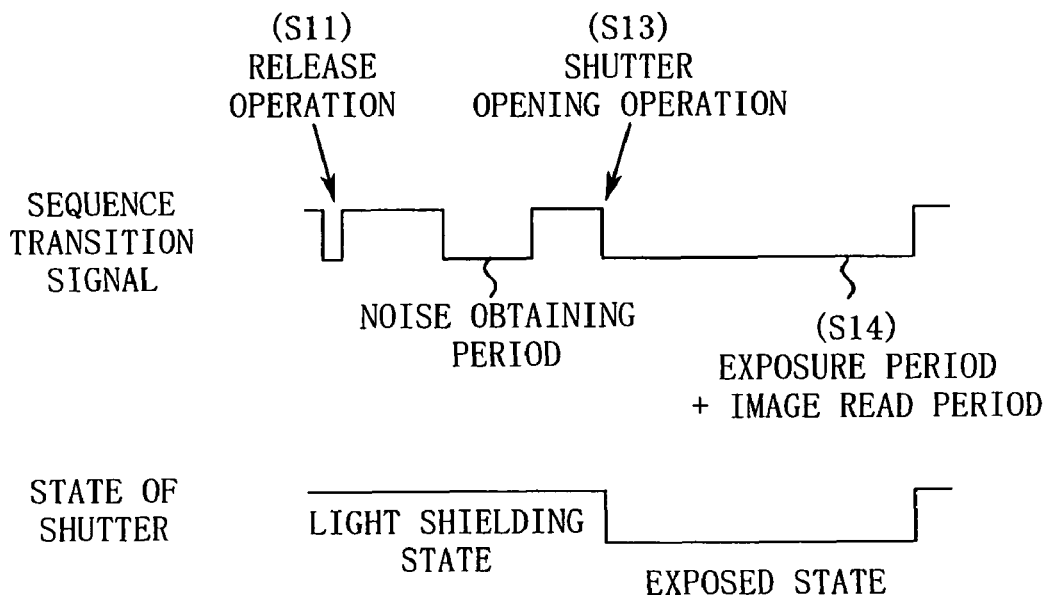
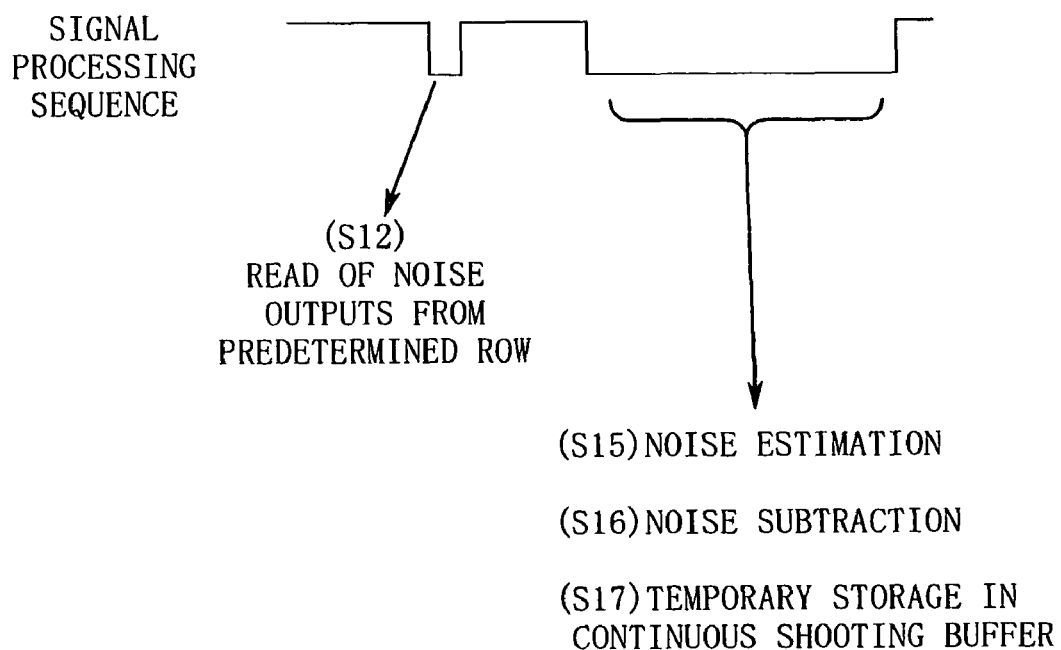

FIG. 9
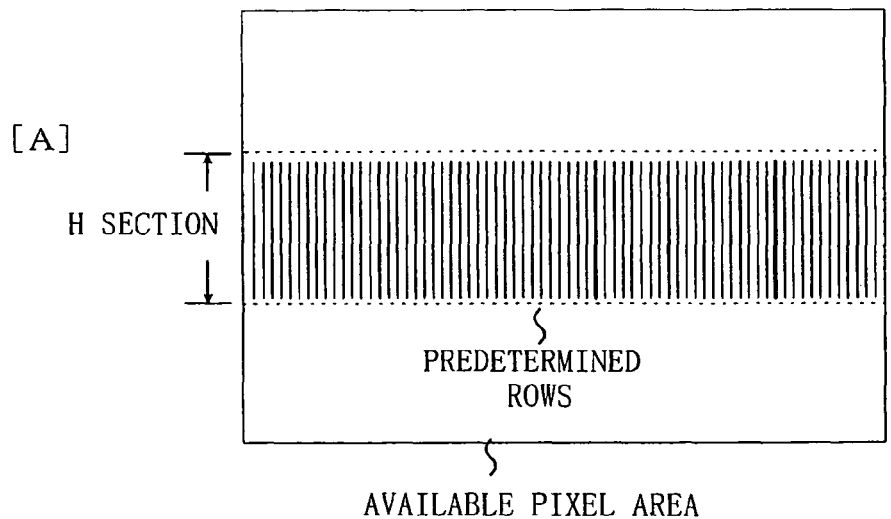
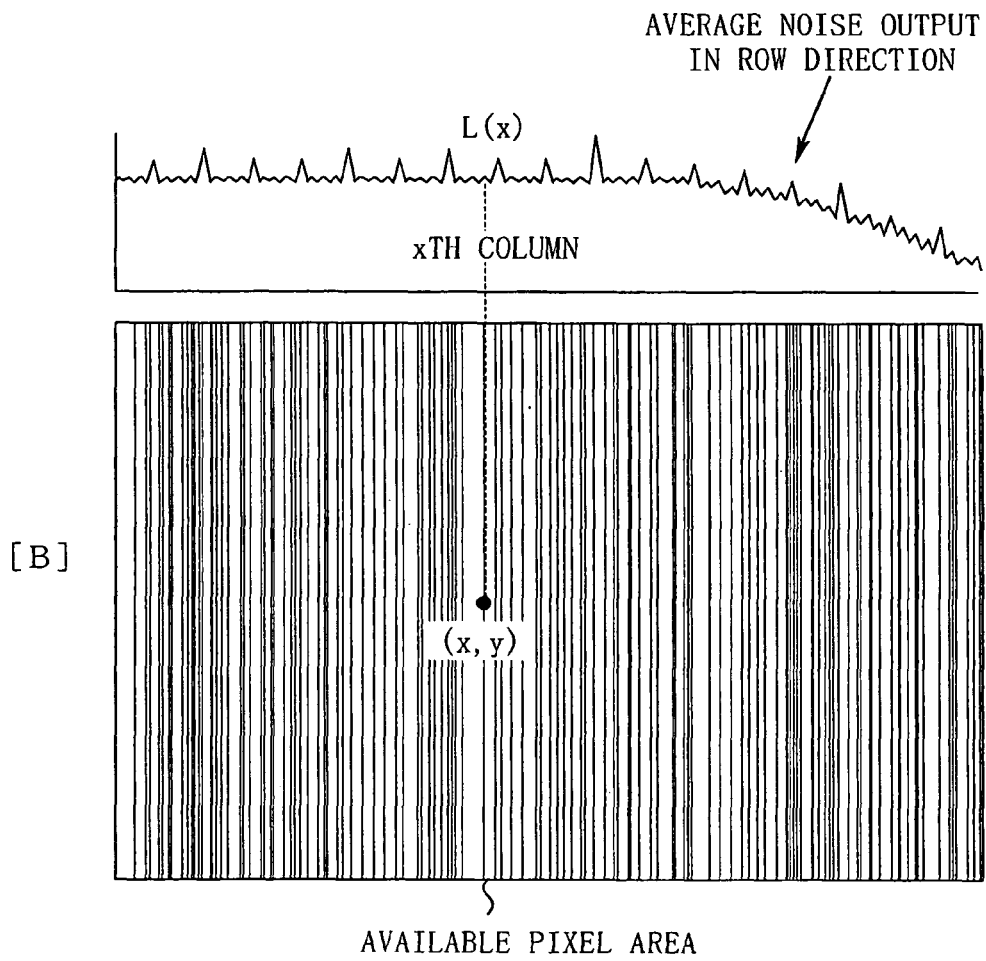

IMAGING DEVICE AND IMAGE PROCESSING PROGRAM FOR ESTIMATING FIXED PATTERN NOISE FROM PARTIAL NOISE OUTPUT OF AVAILABLE PIXEL AREA

CROSS REFERENCE TO RELATED APPLICATION

This application is based upon and claims the benefit of priority from Japanese Patent Application No. 2004-308621, filed on Oct. 22, 2004, the entire contents of which are incorporated herein by reference.

BACKGROUND OF THE INVENTION

1. Field of the Invention

The present invention relates to an imaging device that reduces fixed pattern noise from captured image data.

The present invention also relates to an imaging device that records information on the fixed pattern noise together with the image data and to an image processing program for reducing the fixed pattern noise from the image data by computer processing.

2. Description of the Related Art

Image quality of an imaging device is generally lowered when fixed pattern noise is superimposed on image data. A conventional method improves the image quality by storing the fixed pattern noise for one screen read from an image sensor and eliminating the fixed pattern noise for one screen from the image data by common mode rejection.

In particular, Japanese Unexamined Patent Application Publication No. Hei 7-15632 (hereinafter, referred to as "patent document 1") discloses a technique of obtaining fixed pattern noise with random noise being reduced therefrom, by reading and averaging fixed pattern noise for a plurality of screens.

In order to read the aforesaid fixed pattern noise from the image sensor, it takes the same length of time as it normally takes to read an image. This causes a problem in continuous shooting that the speed of continuous shooting is lowered by the time corresponding to this read time of the fixed pattern noise. Especially in the case of the patent document 1, the delay of the continuous shooting speed is prominent since the fixed pattern noise for the plural screens has to be read.

Further, the read fixed pattern noise occupies a space corresponding to one screen to several screens in a buffer memory in an electronic camera. Accordingly, the buffer memory becomes fully occupied in a short time, causing the delay of the continuous shooting speed.

Due to such double causes, the elimination of the fixed pattern noise leads to a problem of noticeably lowering the speed of the continuous shooting of an electronic camera.

Meanwhile, in the case of eliminating the fixed pattern noise with a computer or the like at a later time, the fixed pattern noise for one screen has to be stored in addition to captured images in an image recording medium (a memory card or the like), which will accordingly cause a problem of reduction in the number of frames recordable in the memory card or the like.

SUMMARY OF THE INVENTION

In view of the above-described problems, it is an object of the present invention to provide an effective fixed pattern noise eliminating technique for shortening the time required for a photographing sequence.

Hereinafter, the present invention will be described.

<<1>> An imaging device of the present invention includes an image capturing unit, a noise obtaining unit, a fixed noise calculating unit, and a noise eliminating unit. The image capturing unit generates image data by photoelectrically converting, pixel by pixel, a subject image formed on an available pixel area of a light-receiving surface. The noise obtaining unit reads a noise output from a partial area of the available pixel area. The fixed noise calculating unit calculates an estimation of fixed pattern noise of the available pixel area by regularly expanding, in the available pixel area, a noise pattern obtained from the noise output read from the partial area. The noise eliminating unit subtracts the fixed pattern noise from the image data.

<<2>> Preferably, the noise obtaining unit reads the noise output from a predetermined row of the available pixel area. The fixed noise calculating unit calculates an estimation of the fixed pattern noise of the available pixel area by expanding, in a column direction of the available pixel area, a noise pattern of the noise output read from the predetermined row.

<<3>> Preferably, a number of the predetermined row from which the noise obtaining unit reads the noise output is plural. The fixed noise calculating unit calculates an estimation of the fixed pattern noise of the available pixel area by expanding, in the column direction of the available pixel area, a noise pattern of the noise output read from the plural predetermined rows.

<<4>> Preferably, the noise obtaining unit reads the noise outputs from a predetermined row and a predetermined column of the available pixel area. Meanwhile, the fixed noise calculating unit calculates an estimation of the fixed pattern noise of an Xth column/a Yth row of the available pixel area based on the noise output of an Xth column of the predetermined row and the noise output of a Yth row of the predetermined column.

<<5>> Preferably, the fixed noise calculating unit calculates an estimation of the fixed pattern noise of the Xth column/Yth row of the available pixel area by weighted addition of the noise output of the Xth column of the predetermined row and the noise output of the Yth row of the predetermined column.

<<6>> Preferably, the fixed noise calculating unit smoothes the noise output of the predetermined column in a column direction. Further, the fixed noise calculating unit calculates an estimation of the fixed pattern noise of the Xth column/Yth row of the available pixel area by modulating the noise output of the Xth column of the predetermined row with the smoothed noise output of the Yth row of the predetermined column.

<<7>> Preferably, the imaging device of the present invention further includes a release unit and a shutter unit. The release unit receives a photographing instruction. The shutter unit opens an optical path to the light-receiving surface according to the photographing instruction to project the subject image onto the light-receiving surface, and causes the image capturing unit to generate the image data.

In such a configuration, the noise obtaining unit obtains the noise output from the image capturing unit during a light-shielding period from when the release unit receives the photographing instruction to when the shutter unit starts the opening operation. Meanwhile, the fixed noise calculating unit accepts the noise output, and calculates an estimation of the fixed pattern noise of a pixel position at a timing synchronous with the pixel position of the image data read later from the image capturing unit. The noise eliminating unit subtracts, substantially in real time, the calculated estimation of the fixed pattern noise from the image data which is read from the image capturing unit.

<<8>> Another imaging device of the present invention includes an image capturing unit, a noise obtaining unit, and a file generating unit.

Among these units, the image capturing unit generates image data by photoelectrically converting, pixel by pixel, a subject image formed on an available pixel area of a light-receiving surface.

The noise obtaining unit reads a noise output from a partial area of the available pixel area.

The file generating unit generates an image file by appending the noise output as information to the image data.

<<9>> An image processing program of the present invention is for processing an image file generated in the aforesaid imaging device set forth in [8], and the program includes program codes to cause a computer to function as an extracting unit, a fixed noise calculating unit, and a noise eliminating unit.

Among these units, the extracting unit reads the image data and the noise output from the aforesaid image file.

The fixed noise calculating unit calculates an estimation of fixed pattern noise of the available pixel area by regularly expanding, in the available pixel area, a noise pattern obtained from the noise output read from the partial area.

The noise eliminating unit subtracts the fixed pattern noise from the image data.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 4[A] and FIG. 4[B] are views showing examples of predetermined rows and predetermined columns respectively;

FIG. 5[A] and FIG. 5[B] are charts illustrating averaging of noise outputs;

FIG. 8 is a timing chart illustrating operations of the second embodiment; and

FIG. 9[A] and FIG. 9[B] are charts illustrating operations of estimating fixed pattern noise based on a noise pattern of predetermined rows.

DETAILED DESCRIPTION OF THE PREFERRED EMBODIMENTS

Hereinafter, embodiments of the present invention will be described in detail based on the drawings.

First Embodiment

Configuration Description of First Embodiment

Figure 1:
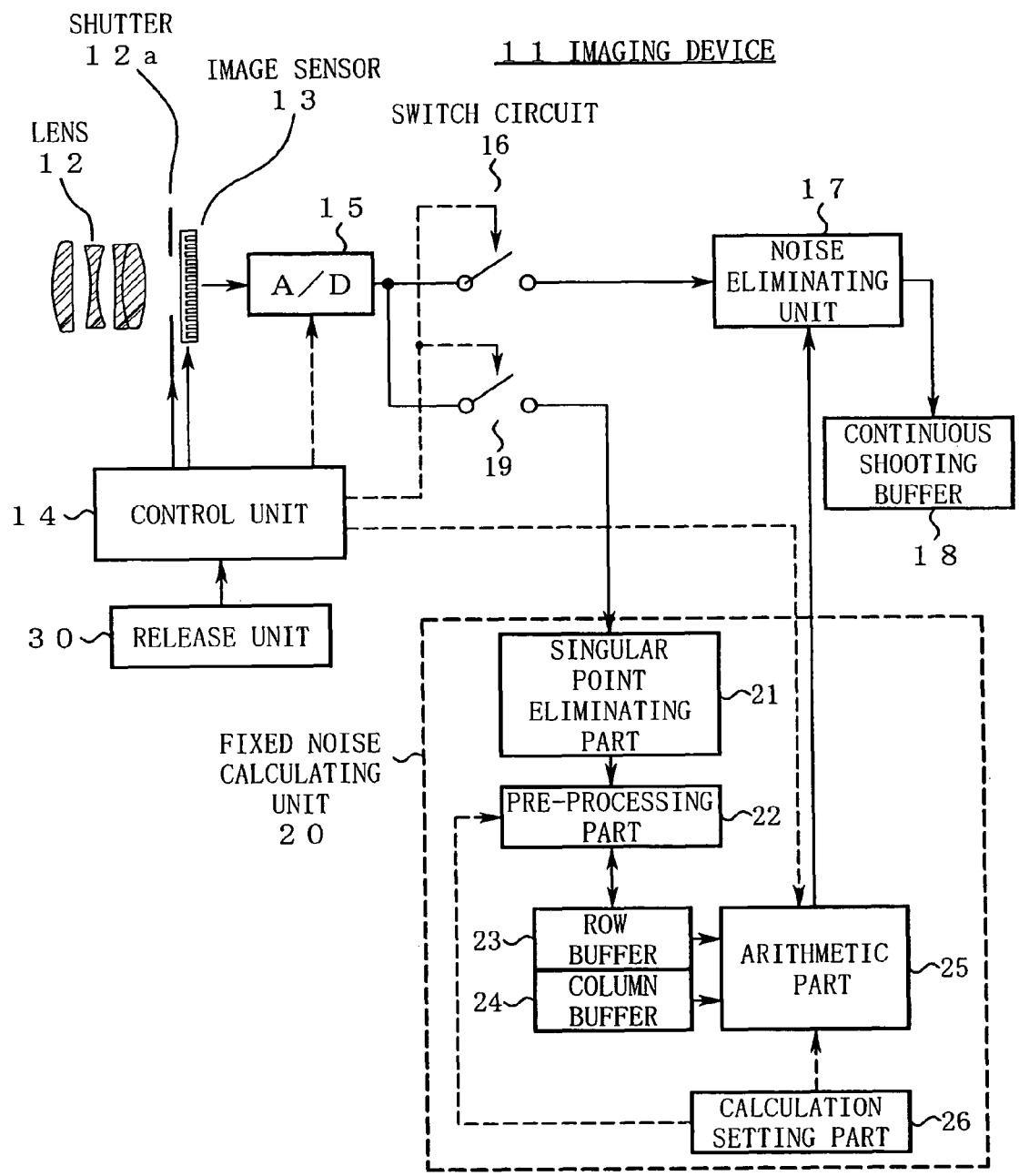
FIG. 1 is a diagram showing a configuration of an imaging device 11 in a first embodiment.

FIG. 1 is a diagram showing a configuration of an imaging device 11 in a first embodiment.

In FIG. 1, a lens 12 is attached to the imaging device 11. A shutter 12a and an image sensor 13 are disposed in an image space of the lens 12. A control unit 14 receives a photographing instruction from a release unit 30. In response to this photographing instruction, the control unit 14 performs a control operation so as to drive the shutter 12a and the image sensor 13 and reads from the image sensor 13 "a noise output obtained from a partial area (a predetermined row, a predetermined column, or the like) of an available pixel area" and "image data for one screen".

A signal thus outputted from the image sensor 13 is inputted to a switch circuit 16 and a switch circuit 19 after being converted to a digital signal in an A/D converting unit 15. The control unit 14 performs changeover control of these switch circuits 16, 19 to divide the output signal of the image sensor 13 into the aforesaid noise output and image data.

The noise output is inputted to a fixed noise calculating unit 20 via the switch circuit 19. The fixed noise calculating unit 20 calculates an estimation of fixed pattern noise for one screen from the noise output of the partial area smaller than the area for one screen.

The fixed noise calculating unit 20 includes therein the following processing units in order to realize efficient estimation/calculation.

(1) a singular point eliminating part 21 eliminating singular point noise
(2) a pre-processing part 22 applying pre-processing such as smoothing to the noise output
(3) a row buffer 23 temporarily storing the noise output in a row direction
(4) a column buffer 24 temporarily storing the noise output in a column direction
(5) an arithmetic part 25 estimating/calculating the fixed pattern noise for one screen based on the noise outputs
(6) a calculation setting part 26 selecting an estimation/calculation algorithm Meanwhile, the image data is inputted to a noise eliminating unit 17 via the switch circuit 16. The noise eliminating unit 17 eliminates the fixed pattern noise from the image data in sequence.

The image data having undergone the processing in the noise eliminating unit 17 is temporarily recorded in a continuous shooting buffer 18.

Figure 2:
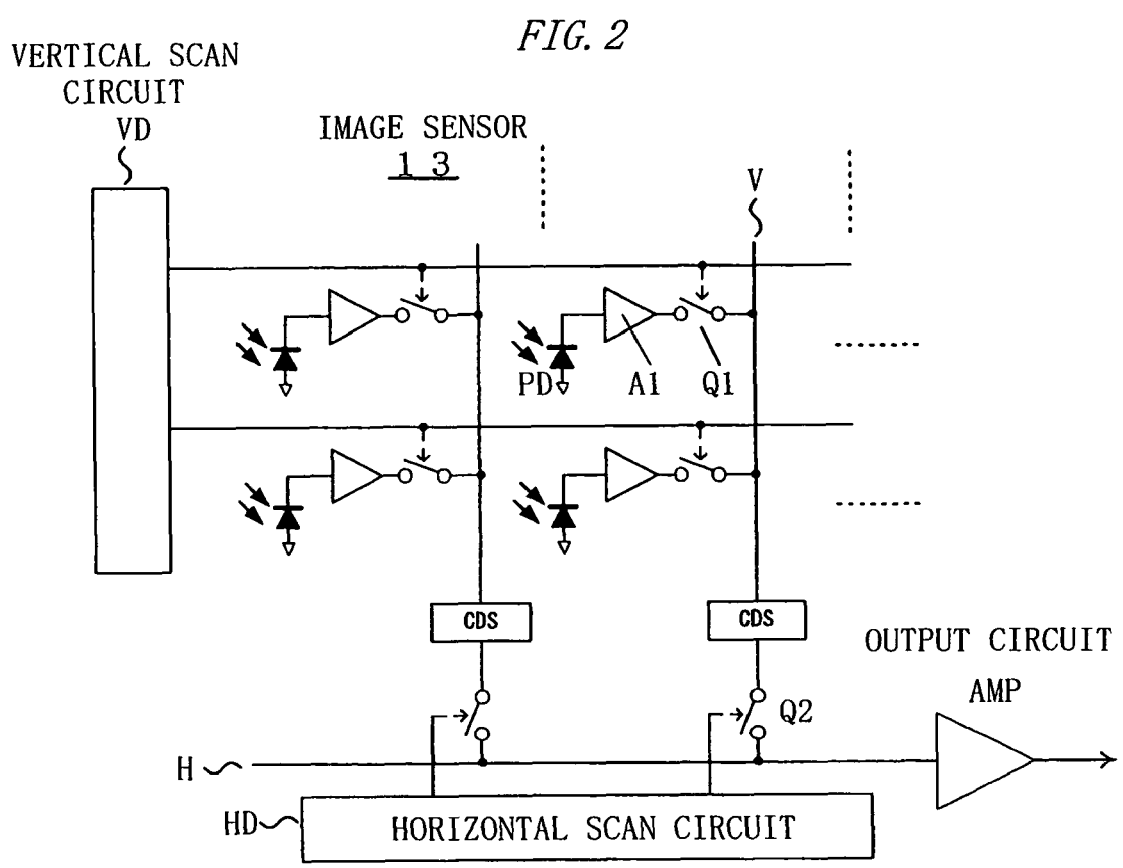
FIG. 2 is a diagram showing a circuit configuration of an image sensor 13.

FIG. 2 is a diagram showing a circuit configuration of the aforesaid image sensor 13.

In FIG. 2, each photodiode PD is arranged for each pixel on a light-receiving surface of the image sensor 13. A pixel signal resulting from photoelectrical conversion by the photodiode PD is amplified via an amplifying element A1 pixel by pixel. The pixel signal after being amplified is read to an exterior of the image sensor 13 through a switch element Q1, a vertical read line V, a correlated double sampling circuit CDS, a switch element Q2, a horizontal read line H, and an output circuit AMP.

Among them, the switch element Q1 selecting a read row is ON/OFF controlled by a vertical scan circuit VD. Further, the switch element Q2 selecting a read column is ON/OFF controlled by a horizontal scan circuit HD.

Description of Operations of First Embodiment

Figure 3:
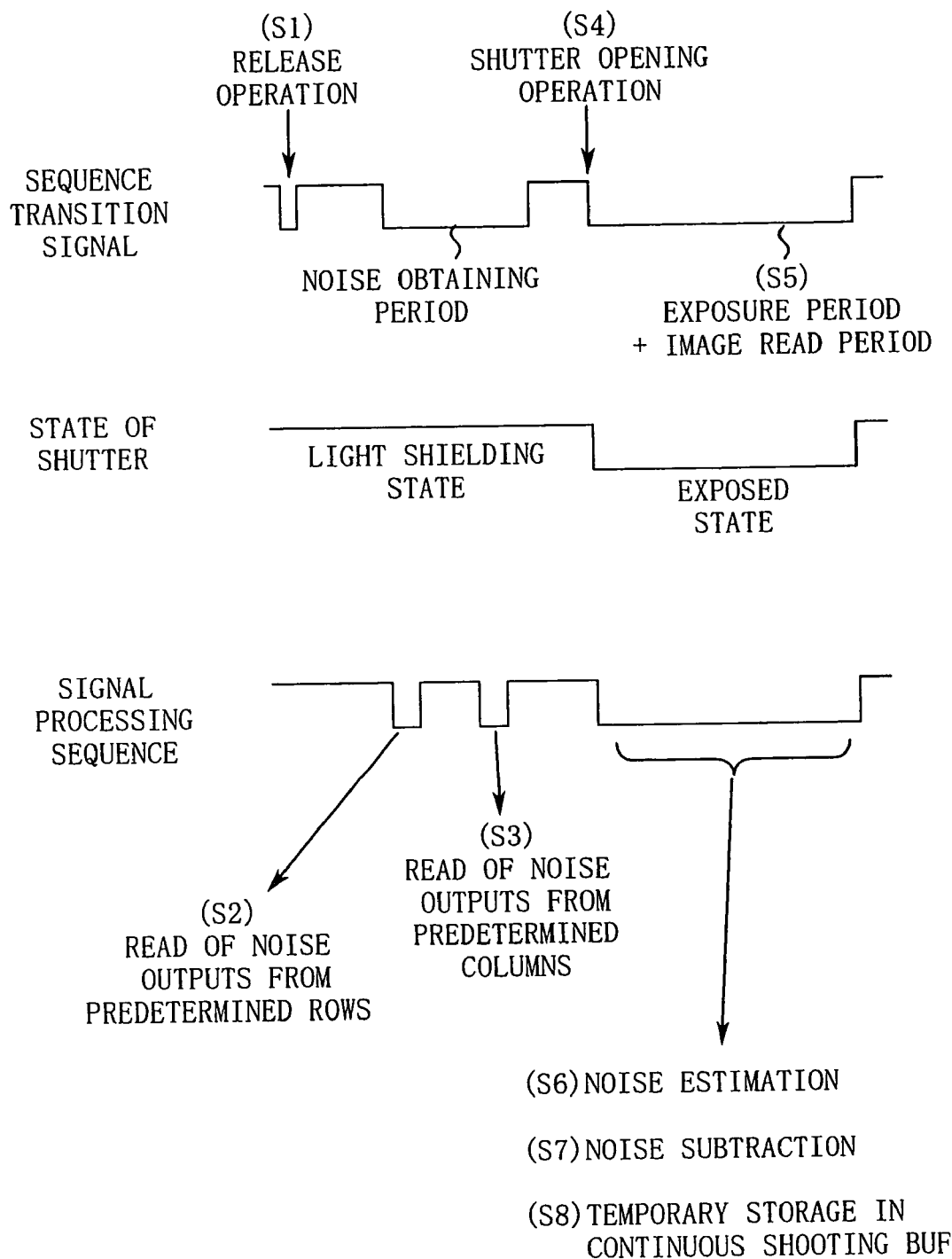
FIG. 3 is a timing chart illustrating operations of the first embodiment.

FIG. 3 is a timing chart illustrating operations of the first embodiment.

Hereinafter, the operations of the first embodiment will be described in the order of the step number shown in FIG. 3.

Step S1: A user gives a photographing instruction to the control unit 14 by operating the release unit 30.

Step S2: The control unit 14 drives the vertical scan circuit VD and the horizontal scan circuit HD in the image sensor 13 while keeping the shutter 12a closed, and selectively reads noise outputs (dark outputs of the photodiodes PD) of predetermined rows shown in FIG. 4[A].

The noise outputs of the predetermined rows are given to the fixed noise calculating unit 20 via the switch circuit 19. In the fixed noise calculating unit 20, the singular point eliminating part 21 preferably eliminates noise at singular point level from the noise outputs of the predetermined rows (see X mark in FIG. 5[A]).

Thereafter, the noise outputs are inputted to the pre-processing part 22 in sequence. The pre-processing part 22 averages the noise outputs of the predetermined rows as shown in FIG. 5[A] to obtain an average noise output L in a row direction. The average noise output L in the row direction is stored in the row buffer 23.

Step S3: Subsequently, the control unit 14 drives the vertical scan circuit VD and the horizontal scan circuit HD in the image sensor 13 while keeping the shutter 12a closed, and selectively reads noise outputs (dark outputs of the photodiodes PD) of predetermined columns shown in FIG. 4[B].

The noise outputs of the predetermined columns are given to the fixed noise calculating unit 20 via the switch circuit 19. In the fixed noise calculating unit 20, the singular point eliminating part 21 preferably eliminates noise at singular point level included in the noise outputs of the predetermined columns (see the X mark in FIG. 5[B]).

Thereafter, the noise outputs are inputted to the pre-processing part 22 in sequence. The pre-processing part 22 averages the noise outputs of the predetermined columns as shown in FIG. 5[B] to obtain an average noise output R in a column direction. The average noise output R in the column direction is stored in the column buffer 24.

Note that the pre-processing part 22 preferably subjects the average noise output R to smoothing such as weighted moving averaging along the column direction, in order to eliminate random noise from the average noise output R in the column direction.

Step S4: The control unit 14, after completing the reading of the noise outputs of the predetermined columns, opens the shutter 12a to start the exposure of the image sensor 13.

Step S5: The control unit 14 closes the shutter 12a after a predetermined exposure time passes, and scan-reads the image data for one screen from the image sensor 13. The A/D converting unit 15 converts the image data to digital data in the order in which they are scan-read, in synchronization with a clock outputted for each pixel from the control unit 14. The image data thus converted to the digital data are inputted via the switch circuit 16 to the noise eliminating unit 17 in the order in which they are scan-read.

Step S6: The arithmetic part 25 finds scanned coordinates (x, y) of the image data inputted to the noise eliminating unit 17, in synchronization with the clock for each pixel outputted by the control unit 14

Figure 6:
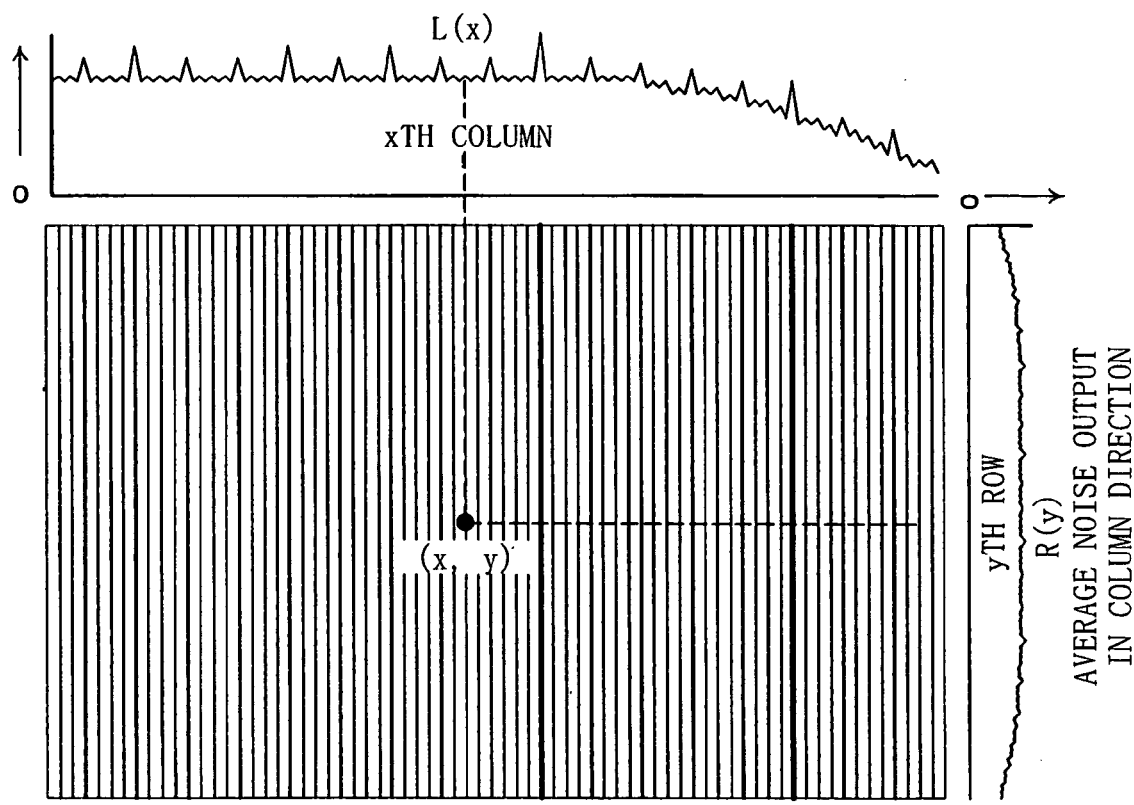
FIG. 6 is a view illustrating an operation of estimating fixed pattern noise based on noise outputs of a row and a column.

According to the scanned coordinates (x, y), the arithmetic part 25 reads an average noise output L(x) of an xth column from the row buffer 23 and reads an average noise output R(y) of a yth row from the column buffer 24 (see FIG. 6).

Based on the average noise outputs L(x), R(y), the arithmetic part 25 calculates an estimation of fixed pattern noise N(x, y) of the scanned coordinates (x, y) corresponding to an intersection thereof.

Here, the fixed pattern noise N(x, y) is preferably estimated/calculated in the following manners.

[Case 1]

The fixed pattern noise N(x, y) is found by weighted addition of the average noise outputs L(x), R(y) with the use of the following equation.

$$N(x,y)=G \cdot L(x)+J \cdot R(y) \qquad (1)$$

Note that G, J are predetermined weighting coefficients and they are set in advance based on contribution ratios of noise patterns in the row direction and the column direction, that is, to what degree they influence the fixed pattern noise.

For example, when a noise pattern in the row direction repeatedly appears in the column direction (so-called vertical stripe noise), G and J are set approximately as G=0.8 and J=0.2.

Note that the weighting coefficients G, J are preferably varied depending on the scanned coordinates (x, y) if the contribution ratios change depending on the position in the screen.

[Case 2]

When the fixed pattern noise is mainly fine vertical stripe noise and moderate noise fluctuation is superimposed on the stripe pattern, the fixed pattern noise N(x, y) can be found by the following equation.

$$N(x,y)=L(x) \cdot [1+M(R(y)-Ro)] \qquad (2)$$

Note that M in the equation is a modulation degree, and for example, M=1. It is preferable to determine the modulation degree M experimentally based on, for example, subjective tests of the quality of an image that has been processed.

Further, Ro corresponds to a value of the average noise output R in a range of the predetermined row (in particular, the center of the range).

Note that the average noise output R(y) is preferably smoothed in the column direction in advance in order to prevent random noise from getting mixed (frequency diffusion by random modulation).

Step S7: The arithmetic part 25 outputs the estimated/calculated fixed pattern noise N(x, y) in synchronization with a timing of the scanned coordinates (x, y) of the image data. The noise eliminating unit 17 subtracts a predetermined ratio of the fixed pattern noise N(x, y) from the image data of the scanned coordinates (x, y). This subtraction ratio is preferably determined experimentally based on, for example, subjective evaluation of image quality of a final image.

The operations described above realize substantially real-time elimination of the fixed pattern noise from the image data without delaying the flow of the image data.

Step S8: The image data from which the fixed pattern noise has been eliminated are temporarily stored in the continuous shooting buffer 18. The imaging device 11 applies color interpolation processing, outline processing, color coordinate conversion, image compression, and so on to the image data while reading the image data from the continuous shooting buffer 18, and sequentially records them in a not-shown recording medium.

Effects Etc. of First Embodiment

In the image sensor 13 shown in FIG. 2, random variation depending on each pixel is effectively eliminated by the correlated double sampling circuits CDS. Therefore, random fluctuation in the fixed pattern noise depending on each pixel of the image sensor 13 is relatively small, and a regular noise pattern is obtained in which noise fluctuation depending on each pixel column and noise fluctuation depending on each pixel row are combined.

For example, in the image sensor 13, variation in column read circuits (the vertical read line V, the correlated double sampling circuit CDS, and the like) causes the occurrence of the vertical stripe noise. This is noise having regularity in the row direction and can be discerned based on the noise tendency of the predetermined rows.

Further, noise fluctuation in the column direction is superimposed on the vertical stripe noise. In the first embodiment, the noise fluctuation of this type is discerned based on the noise tendency of the predetermined columns without obtaining the noise outputs for one screen.

In the first embodiment, after the regular noise patterns in the row direction and the column direction are thus discerned, these noise patterns are combined two dimensionally, whereby the fixed pattern noise for one screen is estimated.

The fixed pattern noise estimated at this time is a noise component having regularity in the row direction and the column direction and thus visually noticeable, also in actual fixed pattern noise. Therefore, eliminating this estimated result from the image data enables the elimination of the visually noticeable, regular noise pattern from the image data, and thus can yield a high effect of image quality improvement.

Further, in the first embodiment, it is only necessary to read the noise outputs from the plural rows and the plural columns in the available pixel area, so that it is possible to complete the reading of the noise within a very short release time lag.

Further, in the first embodiment, substantially no delay is caused in the flow of the image data since the fixed pattern noise is eliminated in accordance with the flow of the image data.

Moreover, in the first embodiment, only the noise outputs for one row and one column need to be stored in the buffer, and the fixed pattern noise for one screen need not be stored in the buffer, although it has been conventionally required. This accordingly enables securing a wider memory space for a continuous shooting buffer for the image data, so that the continuous shooting performance of the imaging device 11 hardly deteriorates even while executing the eliminating processing of the fixed pattern noise.

Next, another embodiment will be described.

Second Embodiment

Figure 7:
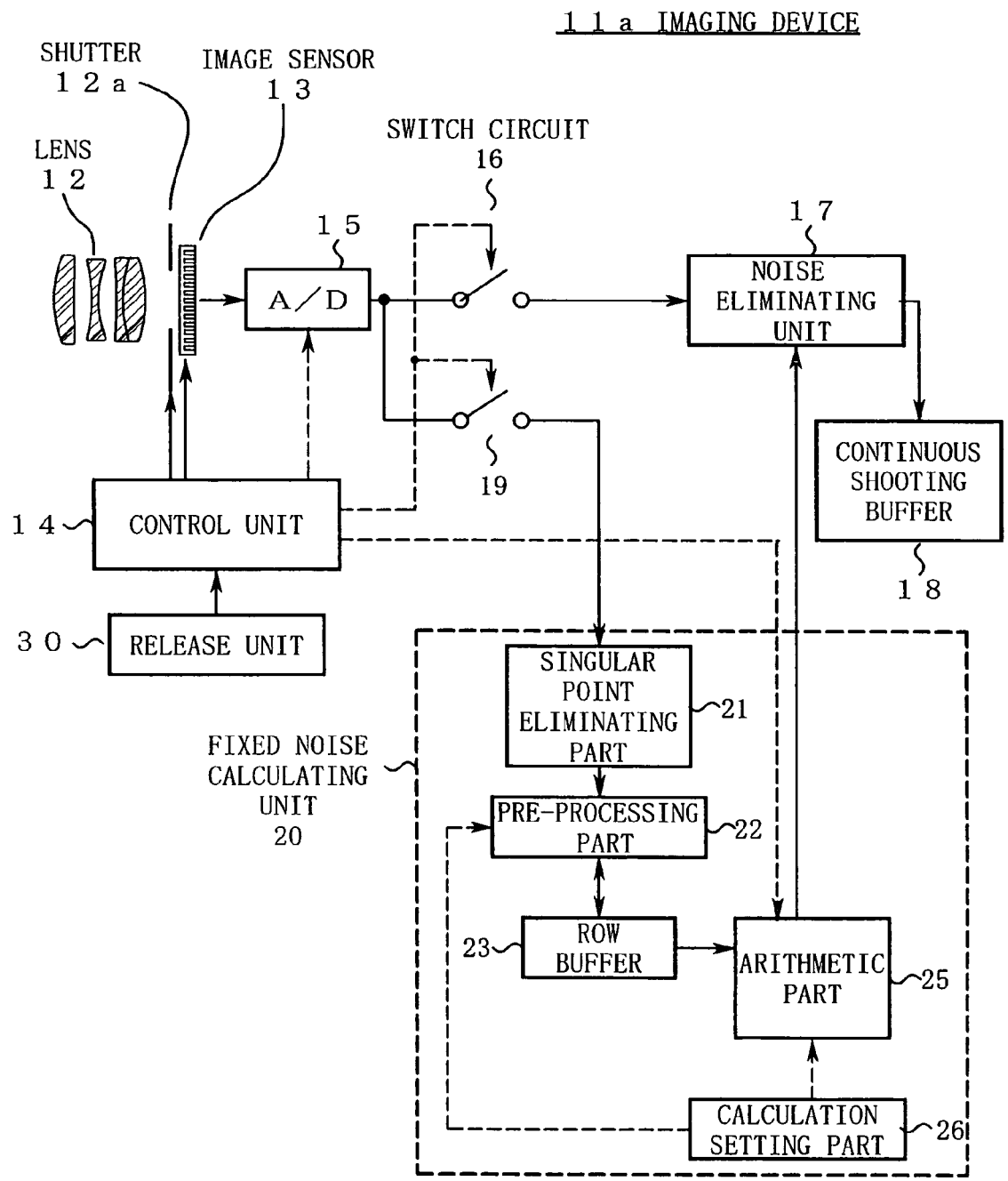
FIG. 7 is a diagram showing a configuration of an imaging device 11a in a second embodiment.

FIG. 7 is a diagram showing a configuration of an imaging device 11a in a second embodiment.

The imaging device 11a is structurally characterized in that the column buffer 24 in the configuration of the first embodiment (FIG. 1) need not be provided. The other configuration is the same as that of the first embodiment (FIG. 1, FIG. 2), and therefore, description of the configuration will be omitted here.

FIG. 8 is a timing chart illustrating operations of the second embodiment.

Hereinafter, the operations of the second embodiment will be described in the order of the step number shown in FIG. 8.
Step S11: A user gives a photographing instruction to a control unit 14 by operating a release unit 30.
Step S12: The control unit 14 drives a vertical scan circuit VD and a horizontal scan circuit HD in an image sensor 13 while keeping a shutter 12a closed, and selectively reads noise outputs (dark outputs of photodiodes PD) of predetermined rows shown in FIG. 9[A].

Here, noise outputs may be read from one predetermined row or noise outputs may be read from a plurality of predetermined rows respectively.

The read noise outputs are given to a fixed noise calculating unit 20 via a switch circuit 19. In the fixed noise calculating unit 20, a singular point eliminating part 21 preferably eliminates noise at singular point level from the noise outputs of the predetermined row.

Thereafter, the noise outputs are inputted to a pre-processing part 22 in sequence. The pre-processing part 22 averages the noise outputs of the predetermined rows to obtain an average noise output L in a row direction. The average noise output L in the row direction is stored in a row buffer 23.
Step S13: After completing the reading of the noise outputs of the predetermined rows, the control unit 14 opens the shutter 12a to start the exposure of the image sensor 13.
Step S14: The control unit 14 closes the shutter 12a after a predetermined exposure time passes and scan-reads image data for one screen from the image sensor 13. An A/D converting unit 15 converts the image data to digital data in the order in which they are scan-read, in synchronization with a clock for each pixel outputted from the control unit 14. The image data thus converted to the digital data are inputted to a noise eliminating unit 17 via a switch circuit 16 in the order in which they are scan-read.
Step S15: An arithmetic part 25 finds scanned coordinates (x, y) of the image data inputted to the noise eliminating unit 17, in synchronization with the clock for each pixel outputted from the control unit 14.

According to the scanned coordinates (x, y), the arithmetic part 25 reads an average noise output L(x) of an Xth column from the row buffer 23 (see FIG. 9[B]).

The arithmetic part 25 estimates fixed pattern noise N(x, y) of the scanned coordinates (x, y) to be the average noise output L(x).
Step S16: The arithmetic part 25 outputs the estimated/calculated fixed pattern noise N(x, y) in timing with the scanned coordinates (x, y) of the image data. The noise eliminating unit 17 subtracts a predetermined ratio of the fixed pattern noise N(x, y) from the image data of the scanned coordinates (x, y). The subtraction ratio is preferably determined experimentally based on, for example, subjective evaluation of image quality of a final image.

The operations described above realize substantially real-time elimination of the fixed pattern noise from the image data without causing any delay to the flow of the image data.
Step S17: The image data from which the fixed pattern noise has been eliminated are temporarily stored in a continuous shooting buffer 18. The imaging device 11 applies color interpolation processing, outline processing, color coordinate conversion, image compression, and so on to the image data while reading the image data from the continuous shooting buffer 18, and records them in a not-shown recording medium in sequence.

Effects Etc. of Second Embodiment

In an image sensor, fixed pattern noise in a vertical stripe form often occurs due to circuit variation depending on each column.

In the second embodiment, a noise fluctuation in the row direction causing the vertical stripe noise is detected by reading the noise outputs of the predetermined rows in an available pixel area. The noise fluctuation in the row direction is extended in the column direction of the available pixel area, so that the fixed pattern noise in the vertical stripe form can be estimated/calculated.

Further, in the second embodiment, when the noise outputs of the plural predetermined rows are read, it becomes possible to reduce irregular noise (random noise) appearing in the individual predetermined rows. As a result, the accurate estimation/calculation of the fixed pattern noise in the vertical stripe form is enabled.

Eliminating such estimation result from the image data enables the elimination of the visually noticeable vertical-stripe pattern from the image data, and thus can yield a high effect of image quality improvement.

Moreover, in the second embodiment, it is only necessary to read the noise outputs of one row to the plural rows in the available pixel area, so that it is possible to complete the reading of noise in a shorter time than in the first embodiment.

Further, in the second embodiment, only the row buffer needs to be provided, and the column buffer is not necessary.

Supplemental Items to Embodiments

In the above-described embodiments, the noise outputs of the plural rows and the plural columns of the available pixel area are read. However, these embodiments are not restrictive. The noise outputs of one row and one column of the available pixel area may be read. In this case, the averaging processing (FIG. 5) of the noise outputs can be omitted.

Further, when a periodic noise fluctuation occurs in the row direction (or the column direction), it is sufficient to read noise outputs of a partial width approximately corresponding to the period. In this case, repeating the obtained noise outputs periodically makes it possible to obtain noise outputs of the whole width.

Incidentally, in the above-described embodiments, the dark outputs read from the photodiodes PD are defined as the noise outputs. In this case, it is possible to estimate/calculate the fixed pattern noise including variation in the outputs of the photodiodes PD. However, these embodiments are not restrictive. For example, output signals (reset outputs) which are read from the amplifying elements A1 while gates of the amplifying elements A1 are kept reset may be defined as the noise outputs. In this case, it is possible to obtain the fixed pattern noise mainly ascribable to a read circuit.

Moreover, the above embodiments have described the cases where the eliminating processing of the fixed pattern noise is completed in the imaging device 11. However, these embodiments are not restrictive. For example, the imaging device side may record the partial noise outputs in an additional information area of the image data. In this case, a computer side can execute the estimation/calculation (S6 in FIG. 6) and the subtraction processing (S7 in FIG. 6) of the fixed pattern noise by program processing at a later time.

In the above-described embodiments, the predetermined rows and the predetermined columns are set in a continuous range as shown in FIG. 4. However, these embodiments are not restrictive. For example, it is also possible to set rows (columns) selected from every plural rows (columns) as the predetermined rows (columns) and read the noise outputs from every plural rows (columns). This enables the estimation of a low spatial frequency component of the fixed pattern noise.

Description of Principles of Embodiments

For facilitating the application to other embodiments, the principles of the above-described embodiments will be described.

[1] In an image sensor in which elements are regularly arranged, fixed pattern noise occurring in an available pixel area is likely to have regular pattern. This regular pattern can be known in advance for each adopted image sensor from element design data, an experimental technique, simulations, and the like. In the embodiments, a pattern as a unit of this regular pattern is found from the partial noise outputs of the available pixel area. Then, the partial noise outputs are expanded according to the regular pattern, thereby estimating the fixed pattern noise appearing in substantially the whole available pixel area.

[2] The fixed pattern noise thus estimated is a component distinguishably noticeable to human eyes since it has the regular pattern. Therefore, eliminating the fixed pattern noise from the image data by common mode rejection can yield a high image quality improvement.

[3] Further, according to the operations of the embodiments, it is only necessary to read the partial noise outputs of the available pixel area, so that the time required for reading the noise outputs can be made shorter than the time conventionally taken. As a result, a photographing sequence including the operation of reading the noise outputs can be effectively shortened, realizing the imaging device with a swift continuous shooting and the like.

[4] Moreover, in the embodiments, only the partial noise outputs need to be read, so that the imaging device only needs to have a smaller memory capacity for the noise outputs. By allocating thus saved memory capacity to the continuous shooting buffer, it becomes easy to increase the number of frames that can be photographed by high-speed continuous shooting even during the eliminating processing of the fixed pattern noise.

[5] Especially when the fixed pattern noise has a regular vertical stripe pattern, it is only necessary to find the noise pattern in the row direction by reading the noise outputs of the predetermined row of the available pixel area. When the noise pattern in the row direction is extended in the column direction of the available pixel area, it becomes possible to estimate the fixed pattern noise in the vertical stripe form.

Note that any pixel row may be set as the predetermined row as long as it is a partial pixel row of the available pixel area. However, in arbitrarily setting the predetermined row, it is preferable to select a pixel row having a small influence of the random noise (noise without any regular pattern).

[6] Further, in an image sensor, two-dimensional fixed pattern noise sometimes occurs due to mutual influence between noise depending on each pixel column and noise depending on each pixel row.

In the case of the fixed pattern noise having regularity in the row and column directions of this type, the fixed pattern noise of the Xth column/Yth row in the available pixel area can be estimated/calculated based on the noise output of the Xth column of the predetermined row and the noise output of the Yth row of the predetermined column.

Note that any pixel column may be set as the predetermined column as long as this column is a partial pixel column in the available pixel area. However, in arbitrarily setting the predetermined column, a pixel column with a small influence of the random noise (noise without any regular pattern) is preferably selected.

[7] Further, in an image sensor, noise depending on each pixel row and noise depending on each pixel column are sometimes superimposed on each other to cause the occurrence of two-dimensional fixed pattern noise.

In the case of this type of the fixed pattern noise occurring due to the superimposition of the noise pattern in the row direction and the noise pattern in the column direction, it is possible to estimate/calculate the fixed pattern noise of the Xth column/Yth row of the available pixel area by weighted addition of the noise output of the Xth column of the predetermined row and the noise output of the Yth row of the predetermined column.

[8] Further, in an image sensor, a difference in output level depending on each pixel column may sometimes cause the occurrence of the noise pattern composed of a stripe of each column, and the level of this stripe changes in the column direction to cause the occurrence of the two-dimensional fixed pattern noise.

In the case of the fixed pattern noise of this type, it is possible to estimate/calculate the fixed pattern noise of the Xth column/Yth row of the available pixel area by modulating the noise output of the Xth column of the predetermined row with the smoothed noise output of the Yth row of the predetermined column.

[9] As described above, the imaging devices of the embodiments read the partial noise outputs of the available pixel area instead of reading the fixed pattern noise for one screen. This results in quick completion of the reading of the noise outputs from the image capturing unit. Therefore, even when the noise output is read immediately before or after the image data is captured, the delay in the photographing sequence is extremely small.

Therefore, the embodiments are preferably designed such that the noise outputs are read from the image capturing unit by utilizing a light shielding period from the photographing instruction (operation of a release button and the like) to the start of an opening operation of the shutter unit. In this case, the elongation of a release time lag can be reduced to a negligible degree.

Further, since the noise outputs are obtained prior to the actual photographing operation, it is possible to estimate/calculate the fixed pattern noise in sequence in timing with the image data read later. In this case, it is possible to eliminate the fixed pattern noise without delaying the flow of the image data read from the image capturing unit.

Further, in this case, since the fixed pattern noise can be obtained in sequence in synchronization with the image data, the fixed pattern noise for one screen estimated/calculated in advance need not be stored. The embodiments are preferably designed so as to make effective use of thus saved memory capacity.

[10] Another possible eliminating processing is such that the imaging device generates an image file by appending information of the partial noise output of the available pixel area to the image data from which the fixed pattern noise has not been subtracted, and a computer eliminates the fixed pattern noise by post-processing.

In this case, since a data volume of the partial noise output of the available pixel area is smaller than that of the fixed pattern noise for one screen, a data volume of the generated image file can be made small. As a result, it is possible to increase the number of frames recordable in a recording medium (a memory card or the like) on the imaging device side. In addition, it is also possible to shorten the time required for transferring the image file in the recording medium to the computer.

Further, the computer side can easily find more accurate fixed pattern noise by more advanced estimation/calculation. For example, it is possible to self-correlate the partial noise patterns to find a pattern period thereof. By repeatedly arranging the partial noise patterns according to this pattern period, it is possible to estimate the fixed pattern noise of the available pixel area. Further, by eliminating the spatial frequency components with low self-correlation from the noise pattern by a filter arithmetic operation, it is possible to find the fixed pattern noise with less random noise.

The invention is not limited to the above embodiments and various modifications may be made without departing from the spirit and scope of the invention. Any improvement may be made in part or all of the components.

What is claimed is:

1. An imaging device comprising:
an image capturing unit that generates image data by photoelectrically converting, pixel by pixel, a subject image formed on an available pixel area of a light-receiving surface;
a noise obtaining unit that reads a noise output only from a partial area of the available pixel area;
wherein the partial area from which the noise output is read is a predetermined row and a predetermined column of the available pixel area;
a fixed noise calculating unit that calculates an estimation of fixed pattern noise of an entire area of the available area by expanding a regularity of a noise pattern of the partial area throughout the entire area of the available pixel area, the noise pattern being obtained from the noise output; and
a noise eliminating unit that subtracts the fixed pattern noise from the image data, and
wherein the fixed noise calculating unit calculates an estimation of the fixed pattern noise of an Xth column/a Yth row of the available pixel area based on the noise output of an Xth column of the predetermined row and the noise output of a Yth row of the predetermined column.

2. The imaging device according to claim 1, wherein
the fixed noise calculating unit calculates an estimation of the fixed pattern noise of the Xth column/Yth row of the available pixel area by weighted addition of the noise output of the Xth column of the predetermined row and the noise output of the Yth row of the predetermined column.

3. The imaging device according to claim 1, wherein
the fixed noise calculating unit smoothes the noise output of the predetermined column in a column direction, and calculates an estimation of the fixed pattern noise of the Xth column/Yth row of the available pixel area by modulating the noise output of the Xth column of the predetermined row with a smoothed noise output of the Yth row of the predetermined column.

4. The imaging device according to claim 1, further comprising:
a release unit that receives a photographing instruction; and
a shutter unit that opens an optical path to the light-receiving surface according to the photographing instruction to project the subject image onto the light-receiving surface, and causes the image capturing unit to generate the image data; wherein:
the noise obtaining unit obtains the noise output during a light-shielding period from when the release unit receives the photographing instruction to when the shutter unit starts in the opening operation;
the fixed noise calculating unit accepts the noise output, and calculates an estimation of the fixed pattern noise of a pixel position at a timing synchronous with the pixel position of the image data read from the image capturing unit; and
the noise eliminating unit subtracts, substantially in real time, the fixed pattern noise from the image data read from the image capturing unit.

5. A non-transitory computer readable medium causing a control unit to execute a process, the process comprising:
generating image data by photoelectrically converting, pixel by pixel, a subject image formed on an available pixel area of a light-receiving surface;

reading a noise output only from a partial area of the available pixel area;
  wherein the partial area from which the noise output is read is a predetermined row and a predetermined column of the available pixel area;
calculating an estimation of fixed pattern noise of an entire area of the available area by expanding a regularity of a noise pattern of the partial area throughout the entire area of the available pixel area, the noise pattern being obtained from the noise output; and subtracting the fixed pattern noise from the image data, and
wherein the calculating an estimation of fixed pattern noise calculates an estimation of the fixed pattern noise of an Xth column/a Yth row of the available pixel area based on the noise output of an Xth column of the predetermined row and the noise output of a Yth row of the predetermined column.

* * * * *